(12) United States Patent
Hartog et al.

(10) Patent No.: US 8,803,891 B2
(45) Date of Patent: Aug. 12, 2014

(54) METHOD FOR PREEMPTING GRAPHICS TASKS TO ACCOMMODATE COMPUTE TASKS IN AN ACCELERATED PROCESSING DEVICE (APD)

(75) Inventors: Robert Scott Hartog, Windemere, FL (US); Ralph Clay Taylor, Deland, FL (US); Michael Mantor, Orlando, FL (US); Sebastien Nussbaum, Lexington, MA (US); Rex McCrary, Oviedo, FL (US); Mark Leather, Los Gatos, CA (US); Philip J. Rogers, Pepperell, MA (US); Thomas R. Woller, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 111 days.

(21) Appl. No.: 13/307,904

(22) Filed: Nov. 30, 2011

(65) Prior Publication Data

US 2012/0194527 A1 Aug. 2, 2012

Related U.S. Application Data

(60) Provisional application No. 61/422,349, filed on Dec. 13, 2010.

(51) Int. Cl.
*G06F 9/46* (2006.01)

(52) U.S. Cl.
USPC ............ 345/503; 345/505; 345/522; 712/34; 712/200

(58) Field of Classification Search
None
See application file for complete search history.

(56) References Cited

U.S. PATENT DOCUMENTS

| 8,095,782 B1 * | 1/2012 | Danskin et al. ............... 712/228 |
| 2007/0103476 A1 * | 5/2007 | Huang et al. .................. 345/522 |
| 2011/0078427 A1 * | 3/2011 | Shebanow et al. ............ 712/244 |

OTHER PUBLICATIONS

Hartog, Robert Scott et al. Pending U.S. Appl. No. 13/325,339. Saving and Restoring Shader Context State, filed Dec. 14, 2011.

* cited by examiner

*Primary Examiner* — Tize Ma
*Assistant Examiner* — Yu Chen
(74) *Attorney, Agent, or Firm* — Sterne, Kessler, Goldstein & Fox PLLC (57) ABSTRACT

Embodiments described herein provide a method of arbitrating a processing resource. The method includes receiving a command to preempt a task and preventing additional wavefronts associated with the task from being processed. The method also includes evicting currently executing wavefronts associated with the task from being processed based upon predetermined criteria.

20 Claims, 4 Drawing Sheets

METHOD FOR PREEMPTING GRAPHICS TASKS TO ACCOMMODATE COMPUTE TASKS IN AN ACCELERATED PROCESSING DEVICE (APD)

CROSS REFERENCE TO RELATED APPLICATIONS

This application claims the benefit of U.S. Provisional Appl. No. 61/422,349, filed Dec. 13, 2010, which is incorporated by reference herein in its entirety.

BACKGROUND

1. Field of the Invention

The present invention is generally directed to computer systems. More particularly, the present invention is directed to methods and systems that allow for context switching of different tasks.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available only for the acceleration of graphics. These constraints arose from the fact that GPUs did not have as rich a programming ecosystem as CPUs. Their use, therefore, has been mostly limited to 2D and 3D graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the CPUs in traditional applications has been extended beyond traditional graphics. Although OpenCL and DirectCompute are a promising start, there are many hurdles remaining to creating an environment and ecosystem that allows the combination of the CPU and CPU to be used as fluidly as the CPU for most programming tasks.

Existing computing systems often include multiple processing devices. For example, some computing systems include both a CPU and a CPU on separate chips (e.g., the CPU might be located on a motherboard and the CPU might be located on a graphics card) or in a single chip package. Both of these arrangements, however, still include significant challenges associated with (i) separate memory systems, (ii) providing quality of service (QoS) guarantees between processes, (iii) programming model, (iv) compiling to multiple target instruction set architectures (ISAs), and (v) efficient scheduling—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

In another example, since conventional multi processing device scheduling does not enable processes to be efficiently identified and/or preempted, a rogue process can occupy the CPU hardware for arbitrary amounts of time. In other eases, the ability to context switch off the hardware is severely constrained—occurring at very coarse granularity and only at a very limited set of points in a processes execution. This constraint exists because saving the necessary architectural and microarchitectural states for restoring and resuming a process is not supported. Lack of support for precise exceptions prevents a faulted job from being context switched out and restored at a later point, resulting in lower hardware usage as the faulted threads occupy hardware resources and sit idle during fault handling.

Graphics tasks being executed in a graphics pipeline often entail extensive state information. Switching one graphics task for another can be an intensive process because the state information must be saved to memory. This can result in increased latency for not only the task for which the context switching is taking place, but also for the task that is being context switched out.

SUMMARY OF EMBODIMENTS

What is needed, therefore, are improved context switching techniques to facilitate efficient arbitration of resources in computing system including a multiple processors.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

More specifically, embodiments of the present invention provide a method and computer readable medium for arbitrating a resource within an APD. An exemplary method includes receiving a command to preempt a task and preventing additional wavefronts associated with the task from being processed. The method also includes evicting currently executing wavefronts associated with the task from being processed based upon predetermined criteria.

Further features and advantages of the invention, as web as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

DETAILED DESCRIPTION OF EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are riot necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
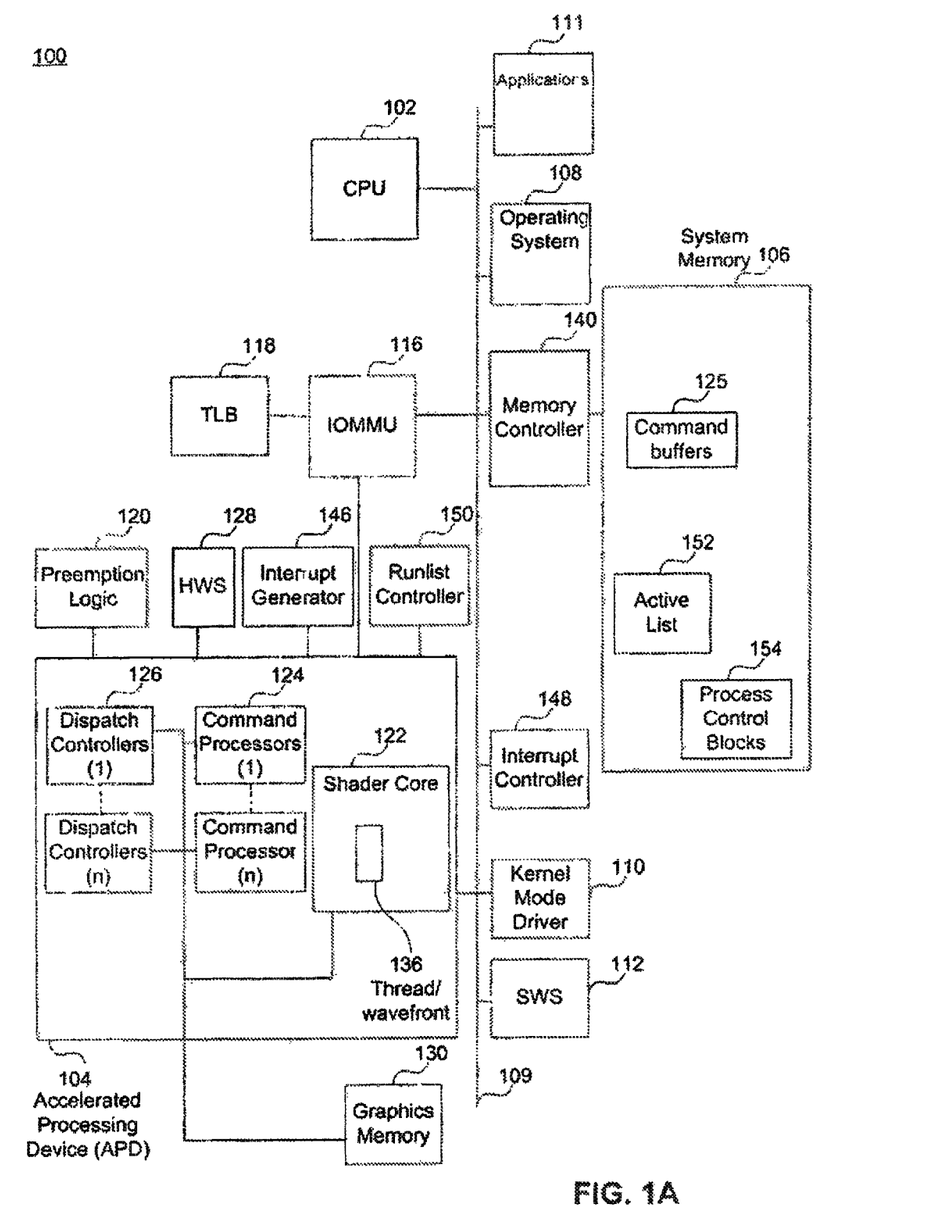
FIG. 1A is an illustrative block diagram of a processing system in accordance with embodiments of the present invention.

FIG. 1A is an exemplary illustration of a unified computing system 100 including a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface. Device drivers, particularly on modern Windows platforms, can run in kernel-mode (Ring 0) or in user-mode (Ring 3).

A benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user modules only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing, associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations, based on commands or instructions received from CPU 102.

For example, commands can be considered a special instruction that is not defined in the ISA and usually accomplished by a Set of instructions from a given ISA or a unique piece of hardware. A command may be executed by a special processor such as a dispatch processor, command, processor, or network controller. On the other hand, instructions can be considered, e.g., a single operation of a processor within a computer architecture. In one example, when using two sets of ISAs, some instructions are used to execute x86 programs and some instructions are used to execute kernels on APD/GPU compute unit.

In an illustrative embodiment, CPU 102 transmits selected commands to APD 104. These selected commands can include graphics commands and other commands amenable to parallel execution. Those selected commands, that can also include compute processing commands, can be executed substantially independently from CPU 102.

APD 104 can include its own compute units (not shown), such as, but not limited to, one or more single instruction multiple data (SIMD) processing cores. As referred to herein, a SIMD is a math pipeline, or programming model, where a kernel is executed concurrently on multiple processing elements each with its own data and a shared program counter. All processing elements execute a strictly identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD/GPU compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit.

A work-item is distinguished from other executions within the collection by its global ID and local ID, in one example, a subset of work-items in a workgroup that execute simultaneously together on a single SIMD engine can be referred to as a wavefront 136. The width of a wavefront is a characteristic of the hardware SIMD engine. As referred to herein, a workgroup is a collection of related work-items that execute on a single compute unit. The work-items in the group execute the same kernel and share local memory and workgroup barriers.

All wavefronts from a workgroup are processed on the same SIMD engine. Instructions across a wavefront are issued one at a time, and when all work-items follow the same control flow, each work-item executes the same program. An execution mask and work-item predication are used to enable divergent control flow within a wavefront, where each individual work-item can actually take a unique code path through the kernel. Partially populated wavefronts can be processed when a full set of work-items is not available at wavefront start time. Wavefronts can also be referred to as warps, vectors, or threads.

Commands can be issued one at a time for the wavefront. When all work-items follow the same control flow, each work-item can execute the same program. In one example, an execution mask and work-item predication are used to enable divergent control flow where each individual work-item can actually take a unique code path through a kernel driver. Partial wavefronts can be processed when a full set of work-items is not available at start time. For example, shader core 122 can simultaneously execute a predetermined number of wavefronts 136, each wavefront 136 comprising a predetermined number of work-items.

Within the system 100, APD 104 includes its own memory, such as graphics memory 130. Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown. APD 104 also includes one or (n) number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof In one embodiment. CP 124 is implemented as a reduced instruction set computer (RISC) engine with microcode for implementing logic including scheduling logic.

APD 104 also includes one or (n) number of dispatch controllers (DCs) 126. In the present application, the term dispatch refers to a command executed by a dispatch controller that uses the context state to initiate the start of the execution of a kernel for a set of workgroups on a set of compute units. DC 126 includes logic to initiate workgroups in the shader core 122. In some embodiments, DC 120 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and a final state. An initial state is a starting point for a machine to process an input data set according to a program in order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102. The term "processing logic" or "logic," as used herein, refers to control flow commands, commands for performing computations, and commands for associated access to resources.

During execution, respective applications, operating system functions, processing logic commands, and system software can reside in memory 106. Control logic commands fundamental to operating system 108 will generally reside in memory 106 during execution. Other software commands, including, for example, KMD 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context (sometimes referred to as process) can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects. On the other hand, process can be considered the execution of a program for an application will create a process that runs on a computer. The operating system can create data records and virtual memory address spaces for the program to execute. The memory and current state of the execution of the program can be called a process. The operating system will schedule tasks for the process to operate on the memory from an initial to final state.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended. PCI (PCI-E) bus, advanced microcontroller bus architecture (AMBA) bus, accelerated graphics port (AGP), or such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system. 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. The unification concepts can allow CPU 102 to seamlessly send selected commands for processing on the APD 104. Under this unified APD/CPU framework, input/output requests from applications 111 will be processed through corresponding operating system functionality.

In one example, KMD 110 implements an application program interface (API) through which CPU 102, or applications executing on CPU 102 or other logic, can invoke APD 104 functionality. For example, KMD 110 can etiquette commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non volatile storage, one or more output interfaces, network interfaces, and one or more displays or display interfaces.

Figure 1B:
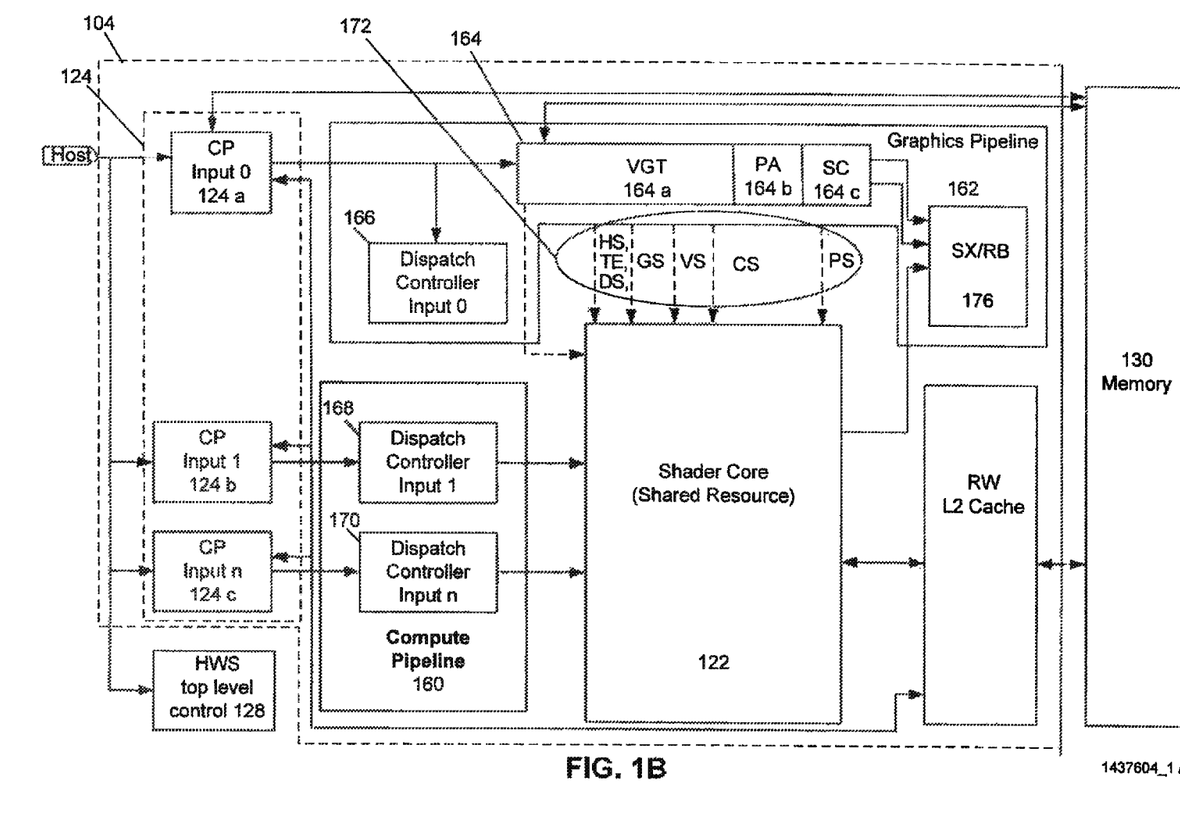
FIG. 1B is an illustrative block diagram illustration of the GPU illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Although other implementations that would be within the spirit and scope of the present invention can be used.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. The exception is for graphics work in shader core 122, which can be context switched.

Shader core 122 can be shared by graphics pipeline 162 and compute pipeline 160. Shader core 122 can be a general processor configured to run wavefronts.

In one example, all work within compute pipeline 160 is processed within shader core 122. Shader core 122 runs programmable software code and includes various forms of data, such as state data. Compute pipeline 160, however, does not send work to graphics pipeline 162 for processing. After processing of work within graphics pipeline 162 has been completed, the completed work is processed through a render back unit 176, which does depth and color calculations, and then writes its final results to graphics memory 130.

Figure 2:
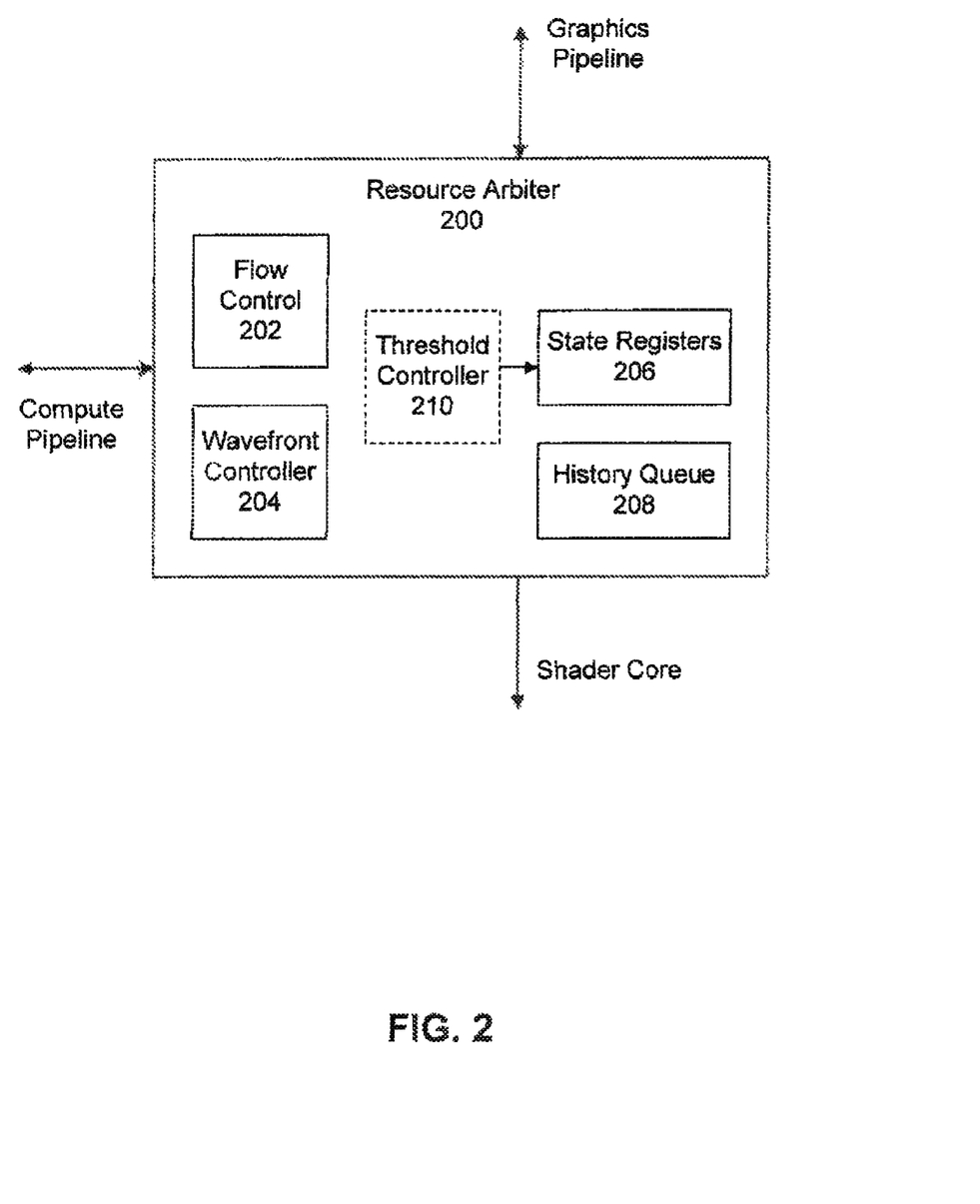
FIG. 2 is an illustrative block diagram of a resource arbiter, according to an embodiment of the present invention.

FIG. 2 is a block diagram illustration of a resource arbiter (RA) 200. RA 200 can be implemented in APD 104. RA 200 includes a flow control module 202, a wavefront controller 204, state registers 206, and a history queue 208. RA optionally includes a threshold controller 210. RA 200 can be implemented using hardware, software, firmware, or any combination thereof. For example, RA 200 can be implemented as programmable hardware. In such an embodiment, each of flow control module 202, wavefront controller 204, and threshold controller 210 can be respective hardware blocks or can be included in the same hardware block.

RA 200 can be included in a APD and used to arbitrate access to a shader core. For example, RA 200 can be included in shader core 122 of APD 104. In another embodiment, RA 200 can be included in graphics pipeline 162. In still another embodiment, RA 200 can be its own hardware block in APD 104.

As shown in FIG. 2, RA 200 can be configured to communicate with graphics pipelines, compute pipelines, and a shader core. For example, RA 200 can be configured to communicate with compute pipeline 160, graphics pipeline 162, and shader core 122. The operation of RA 200 will be described with reference to the embodiment of FIG. 3.

Figure 3:
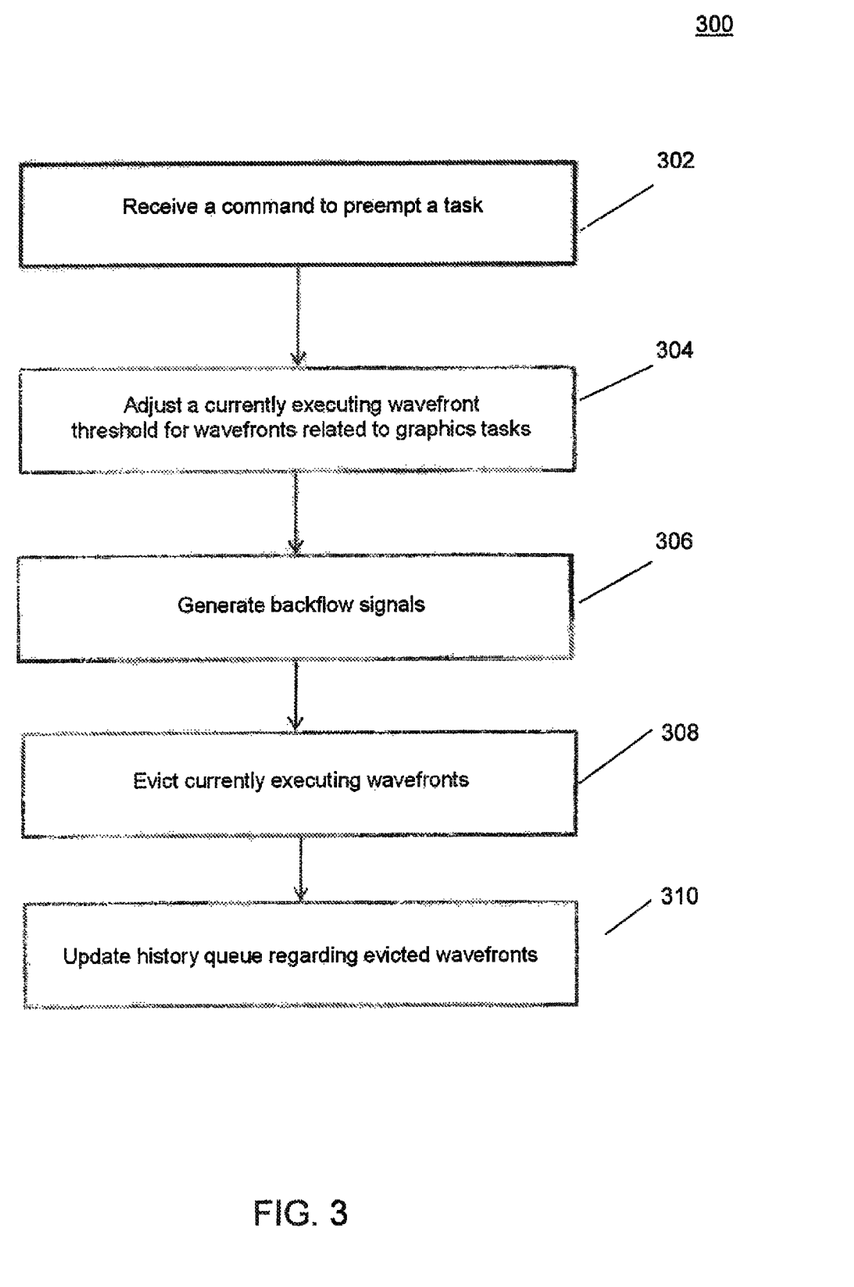
FIG. 3 is a flowchart illustrating a method for arbitrating a resource, according to an embodiment of the present invention.

FIG. 3 is a flowchart 300 of an exemplary method of arbitrating resources in accordance with the present invention. Flowchart. 300 will be described with reference to the embodiment of FIG. 2, but is not limited to that embodiment. The steps of flowchart 300 do not have to occur in the order shown. The steps of flowchart 300 will be described below.

In step 302, a command to preempt a task is received. The task can be of a type, (e.g., generally a graphics task or a specific graphics task type, such as a pixel task). In one example, the preemption command can be generated so that another task can be executed. For example, the preemption command can be used to preempt graphics tasks so that a compute task can be executed.

For example, in FIG. 2, RA 200 can receive a command to preempt a graphics task. In one embodiment, RA 200 can receive the command from RLC 150. In another embodiment, RA 200 can receive the command from compute pipeline 160.

In step 304, a currently executing wavefront threshold is adjusted. For example, in FIG. 2, state registers 206 can store currently executing wavefront thresholds for different types of tasks. Alternatively, RA 200 could evict all in-flight graphics wavefronts upon receipt of an eviction command without the use of thresholds.

State registers 206 can also include a counter indicative of the number of wavefronts associated with a task of a given type that are in-flight in particular, wavefront controller 204 can be configured to generate and launch new wavefronts and to load information pertaining to the new wavefronts on resources (e.g., SIMDs) in shader core 122. When wavefront controller 204 launches a wavefront, wavefront controller 204 can increment a corresponding counter stored in state registers 206. When a wavefront completes its execution, wavefront controller 204 can decrement the corresponding counter stored in state registers 206. Thus, state register 206 can include both the in-flight thresholds pertaining to each type of tasks and the number of wavefronts associated with each type that are currently in-flight.

In an embodiment, RA 200 can include a threshold controller 210. Threshold controller 210 can be configured to update one or more thresholds stored in state registers 206 responsive to the received, preemption command. For example, upon receiving an instruction to preempt a graphics command, threshold controller 210 can be configured to update all currently executing threshold(s) that pertain to graphics tasks. For example, the in-flight threshold(s) that pertain, to graphics tasks can be reduced to a minimal or reduced amount (e.g., from about 600 in normal operation to about 50) or to zero. In another embodiment. RA 200 does not include threshold controller 210. In such an embodiment, state registers 206 can be configured to receive signals from outside of RA 200 to update the threshold(s), e.g., from other elements of APD 104.

In step 306, backflow signals are generated. For example, in FIG. 2, flow control module 202 can be configured to generate backflow signals. For example, flow control module 202 can be configured to compare a threshold for a type of task with a value of a corresponding counter to determine Whether the number of wavefronts associated with tasks of the type that are in-flight exceeds the threshold. The backflow signal can indicate that shader core 122 cannot handle any more tasks of that type. For example, the backflow signal can generally indicate that shader core 122 cannot handle any more graphics tasks. Or, more specifically, the backflow signal can indicate that shader core 122 cannot handle any more tasks originating from a particular stage of graphics pipeline 162. (e.g., pixel tasks from scan converter 162).

As would be appreciated by those skilled in the art, graphics pipeline 162 can be configured to stall. That is, when one stage of graphics pipeline 162 cannot complete work from a previous stage, the pipeline stalls. Thus, when backflow signals generated by flow control module 202 reach a stage in graphics pipeline 162, graphics pipeline 162 stalls because that stage cannot complete its task without being able to access shader core 122.

Therefore, unlike shader core 122, where tasks are context switched in favor of other tasks, graphics pipeline 162 is not context switched. Rather, graphics pipeline 162 is effectively stalled so that another task can be executed using shader core 122 (e.g., a compute task).

Stalling graphics pipeline 162 can have certain advantages as compared to context switching graphics pipeline 162. For example, in the course of the operation graphics pipeline 162, a relatively large amount of state information can be generated. If a conventional context switching method were applied, this state information would have to be stored into memory and reloaded when the graphics task was re-started. On the other hand, by stalling graphics pipeline 162, the state information can stay in graphics pipeline 162 and not have to be stored and later reloaded.

In step 308, currently executing wavefronts can be evicted. For example, in-flight wavefronts associated with tasks of a certain type can be evicted from shader core 122. For example, currently executing wavefronts associated with tasks of the type(s) for which the threshold(s) were adjusted in step 304 can be evicted. For example, wavefront controller 204 can be used to evict these wavefronts from shader 122.

In one embodiment, wavefront controller 204 can wait a time quanta (e.g., a grace period) before evicting the wavefronts from shader core 122. Often, wavefronts can be executed relatively quickly. Thus, waiting a short grace period can allow most or all wavefronts to complete their operation rather than being evicted. Evicting wavefront involves saving state information associated with the wavefront to memory. By allowing the wavefront to complete its operation by providing a short grace period (rather than immediately evicting it), the save (and subsequent restore) operations can often be avoided. For more information on save and restore operations involved in evicting a wavefront, Ser. No. 13/325,339, entitled "Method of Saving and Restoring APD Shader Context State Using a Trap Routine," which is incorporated herein in its entirety.

If all currently executing wavefronts execute during the grace period, step 308 may not have to be executed. Thus, step 308 can be optional.

In step 310, a history queue is updated regarding the evicted wavefronts. For example in FIG. 2, history queue 208 can be updated by wavefront controller 204 regarding the evicted wavefronts. The evicted wavefronts must be executed before new wavefronts of that type are executed (e.g., after the task for which the context switching took place is complete). By including information, relating to which wavefronts were evicted from shader core 122, history queue 208 can be used to ensure that evicted wavefronts are executed before new wavefronts.

Step 308 can be optional. For example, depending on whether the currently executing wavefronts complete in the grace period, step 308 may not be executed.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of arbitrating a resource within an accelerated processing device (APD), comprising:
    receiving a command to preempt a task;
    preventing additional wavefronts associated with the task from being processed;
    adjusting a currently executing wavefront threshold associated with the task in response to receiving the command; and
    determining whether to evict a currently executing wavefront associated with the task from being processed based on the threshold.

2. The method of claim 1, further comprising updating a history queue in response to the wavefront being evicted.

3. The method of claim 1, further comprising waiting a time quanta before the evicting so that one or more currently executing wavefronts associated with the task can complete execution.

4. The method of claim 1, wherein the adjusting the currently executing wavefront threshold comprises setting the currently executing wavefront threshold to zero.

5. The method of claim 1, wherein the task is a graphics task.

6. The method of claim 1, further comprising generating a backflow signal in response to an amount of concurrently executing wavefronts exceeding the threshold.

7. A resource arbiter, comprising:
    registers configured to store a currently executing wavefront threshold associated with one type of task;
    wherein the threshold is adjusted in response to a command to context switch in favor of another type of task; and
    a flow controller configured to generate a backflow signal responsive to a number of currently executing wavefronts associated with the one type of task when the threshold is exceeded.

8. The resource arbiter of claim 7, further comprising a wavefront controller configured to evict at least one of the currently executing wavefronts.

9. The resource arbiter of claim 8, further comprising a history queue configured to store a value pertaining to each of the at least one evicted wavefronts.

10. The resource arbiter of claim 9, wherein the wavefront controller is configured to generate wavefronts.

11. The resource arbiter of claim 7, wherein the resource arbiter is configured for coupling to a shader core.

12. The resource arbiter of claim 7, wherein the one type of task is a graphics task.

13. The resource arbiter of claim 7, wherein the one type of task originates from a stage in a graphics pipeline.

14. The resource arbiter of claim 7, wherein the resource arbiter is configured for coupling to at least one of a compute pipeline and a graphics pipeline.

15. The resource arbiter of claim 7, wherein the backflow signal results in a graphics pipeline becoming stalled.

16. A non-transitory computer readable medium carrying one or more sequences of one or more instructions for execution by one or more processors to perform a method for arbitrating a resource, the instructions when executed by the one or more processors, cause the one or more processors to:
    receive a command to preempt a task;
    prevent additional wavefronts associated with the task from being processed;
    adjust a currently executing wavefront threshold associated with the task in response to receiving the command; and
    determine whether to evict a currently executing wavefront associated with the task from being processed based on the threshold.

17. The method of claim 6, wherein the backflow signal results in a graphics pipeline becoming stalled.

18. The method of claim 1, further comprising saving state information associated with an evicted wavefront.

19. The non-transitory computer readable medium of claim 16, wherein the instructions when executed by the one or more processors further cause the one or more processors to:
    generate a backflow signal in response to a counter value indicating an amount of concurrently executing wavefronts exceeding the threshold.

20. The non-transitory computer readable medium of claim 16, wherein the instructions when executed by the one or more processors, further cause the one or more processors to:
    save state information associated with an evicted wavefront.

* * * * *